United States Patent
Horstmann

(10) Patent No.: US 6,363,356 B1
(45) Date of Patent: Mar. 26, 2002

(54) REFERRER-BASED SYSTEM FOR TRY/BUY ELECTRONIC SOFTWARE DISTRIBUTION

(75) Inventor: Cay S. Horstmann, Cupertino, CA (US)

(73) Assignee: Preview Software, Cupertino, CA (US)

( * ) Notice: Subject to any disclaimer, the term of this patent is extended or adjusted under 35 U.S.C. 154(b) by 0 days.

(21) Appl. No.: 09/116,591

(22) Filed: Jul. 16, 1998

(51) Int. Cl.⁷ .................................................. G06F 17/60
(52) U.S. Cl. ............................ 705/26; 705/14; 705/27; 705/39
(58) Field of Search ............................... 705/14, 39, 26, 705/400, 27; 380/4, 21, 49, 24, 25, 30; 395/237, 291

(56) References Cited

U.S. PATENT DOCUMENTS

| | | | | |
|---|---|---|---|---|
| 4,999,806 A | * | 3/1991 | Chernow et al. | 364/900 |
| 5,684,963 A | * | 11/1997 | Clement | 395/226 |
| 5,710,884 A | * | 1/1998 | Dedrick | 395/200.47 |
| 5,717,923 A | * | 2/1998 | Dedrick | 395/613 |
| 5,724,521 A | * | 3/1998 | Dedrick | 395/226 |
| 5,817,912 A | * | 10/1998 | Pedrazzini et al. | 800/2 |
| 5,850,442 A | * | 12/1998 | Muftic | 380/21 |
| 5,892,900 A | * | 4/1999 | Ginter et al. | 395/186 |
| 5,903,882 A | * | 5/1999 | Asay et al. | 705/44 |
| 5,910,987 A | * | 6/1999 | Ginter et al. | 380/24 |
| 5,915,019 A | * | 6/1999 | Ginter et al. | 380/4 |
| 5,915,093 A | * | 6/1999 | Berlin et al. | 395/200.49 |
| 5,949,876 A | * | 9/1999 | Ginter et al. | 380/4 |

FOREIGN PATENT DOCUMENTS

JP 9642543 * 9/1997 ........... G06F/17/60

* cited by examiner

Primary Examiner—Vincent Millin
Assistant Examiner—Pedro R. Kanof
(74) Attorney, Agent, or Firm—Burns, Doane, Swecker & Mathis, L.L.P.

(57) ABSTRACT

The present invention, generally speaking, makes possible an associates program for electronic content distribution by providing a mechanism whereby a referrer may be identified at the time of purchase in a download-then-pay system. In accordance with one embodiment of the invention, an identifier or marker is added to the electronic content at the time of download. Merchant and purchase location information may also be added. At the time of purchase, a commerce module retrieves the identifier and presents it to the merchant server. The commerce module may also form part of the download or may originate from another source. The identifier may be used for various purposes. For example, the identifier may be used, directly or indirectly, to identify a referrer, to whom a referral fee is then credited. Also, the identifier may be used to look up offer information, since the price at the time of purchase may be different than the offer price at the time of download. The invention is applicable not only to Try/Buy software distribution but more generally to download-then-pay electronic content distribution and rental programs.

14 Claims, 4 Drawing Sheets

REFERRER-BASED SYSTEM FOR TRY/BUY ELECTRONIC SOFTWARE DISTRIBUTION

BACKGROUND OF THE INVENTION

1. Field of the Invention

The present invention relates to electronic content distribution.

2. State of the Art

As electronic commerce matures, examples have emerged of successful business models for electronic commerce. One such successful model is an "associates program" of a type popularized by the Amazon.com bookseller site. An associate, someplace on the associate's Web site, mentions a recommended book and makes a link to the bookseller's catalog page for the book. The associate automatically begins earning referral fees for sales generated by these links. While some associate sites may be relatively obscure, other associate sites, such as on-line magazines, may be heavily trafficked.

In the foregoing instance, giving referral credit is straightforward. The identify of the referrer may be embedded in the link. When the bookseller's Web site receives the link, it extracts the identity of the referrer and takes appropriate action to ensure that credit is given to the referrer. This action occurs immediately upon click through.

Clearly, such an associates program is applicable not only to books but to all objects of electronic commerce, including, for example, electronic content such as software, digital pictures and sounds, etc. Software is increasingly distributed electronically (electronic software distribution, or ESD). ESD technologies may be categorized as "Buy Before You Try" (Buy/Try) and "Try Before You Buy" (Try/Buy). Buy/Try may follow a pay-then-download model or a download-then-pay model. The Try/Buy approach, on the other hand, is clearly favored by software purchasers and offers advantages to software publishers as well. However, while Buy/Try technology is relatively straightforward, Try/Buy technology is considerably more complex, with purchase occurring at any time within a trial period (e.g., 30 days), if at all. Software that allows a software publisher to perform Try/Buy self-wrapping of a software program is sold by the present assignee.

In an associates program of the type described, the on-line merchant's server requires knowledge of the source of the referral at the time of sale. In the case of Try/Buy ESD, the sale may occur at any time during a trial period or may not occur at all. For Try/Buy ESD, presently no convenient mechanism exists for identifying the referrer to the merchant server at the time of sale. The same problem exists for electronic distribution of all types of electronic content where distribution follows a download-then-pay model.

SUMMARY OF THE INVENTION

The present invention, generally speaking, makes possible an associates program for electronic content distribution by providing a mechanism whereby a referrer may be identified at the time of purchase in a download-then-pay system. In accordance with one embodiment of the invention, an identifier or marker is added to the electronic content at the time of download. Merchant and purchase location information may also be added. At the time of purchase, a commerce module retrieves the identifier and presents it to the merchant server. The commerce module may also form part of the download or may originate from another source. The identifier may be used for various purposes. For example, the identifier may be used, directly or indirectly, to identify a referrer, to whom a referral fee is then credited. Also, the identifier may be used to look up offer information, since the price at the time of purchase may be different than the offer price at the time of download. The invention is applicable not only to Try/Buy software distribution but more generally to download-then-pay electronic content distribution and rental programs.

BRIEF DESCRIPTION OF THE DRAWING

The present invention may be further understood from the following description in conjunction with the appended drawing. In the drawing.

DETAILED DESCRIPTION OF THE PREFERRED EMBODIMENTS

Figure 1:
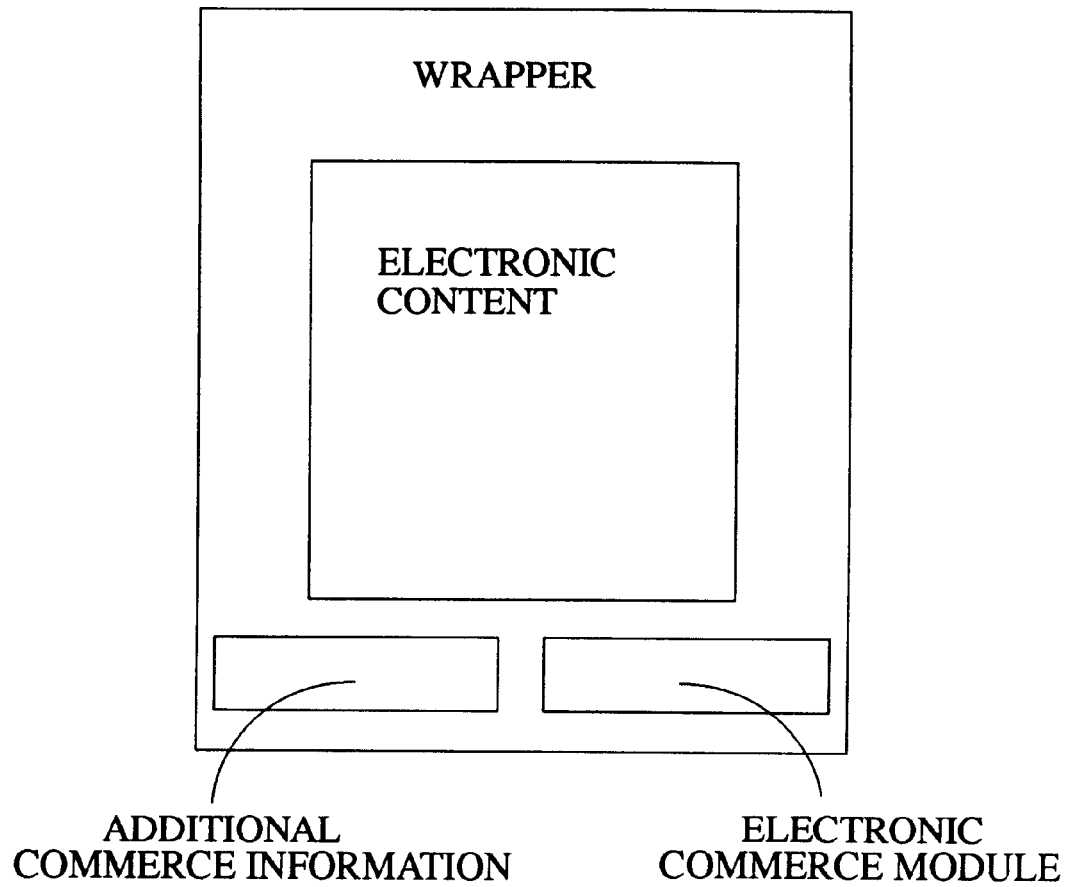
FIG. 1 is a conceptual diagram of a BOB to be dynamically branded at time of download.

Referring now to FIG. 1, a conceptual diagram is shown of electronic content modified in accordance with one aspect of the present invention for electronic distribution in the context of an associates program of the type described. The electronic content is assumed to have added to it a wrapper that in some manner controls access to the electronic content. The wrapper may take any of numerous forms. To the wrapper is added additional commerce information.

The present invention may be applied to various types of ESD mechanisms. One such mechanism is a multi-tier Try/Buy ESD mechanism described more fully in U.S. patent application Ser. 08/921,394 filed on Aug. 29, 1997, entitled MULTITIER ELECTRONIC SOFTWARE DISTRIBUTION, incorporated herein by reference. An important feature of a multi-tier ESD system is that commerce information be made available to channel partners outside a product file (e.g., a setup file set) that contains the electronic content, to allow information to be readily added. Since the original product file makes no provision for commerce information to be added, the commerce information must be added to the product download (stored, for example, in a "license information file," or LIF). To facilitate interpretation of the commerce information, an executable setup file may be added that executes after product download and stores the commerce information in a well-known place from which it may later be retrieved and interpreted. Referring again to FIG. 1, where the electronic content is an executable, a secondary executable setup file functions as a wrapper that surrounds a setup file set containing an original executable setup file. Instead of adding an executable setup file, alternatively, a mechanism such as a browser plug-in or similar resident program may reside on the user machine to detach and store the commerce information such that it may later be retrieved.

The product download may be readily modified, for example either by simply adding extra bytes onto the end of the file or by including an empty field within the file that is later filled. The information added to the file may include a referrer identifying information received during a referral from a Web site, or may include a transaction-specific identifier that may be used to access a database in which various transaction-specific information items are stored, e.g., referrer, offer information, etc. Note that the format of the product download is known to and controlled by the ESD technology provider. Compatibility issues are therefore avoided. Marking the software product with the identity of the referrer ensures that credit is given to the referrer when and if the software product is purchased.

Figure 2:
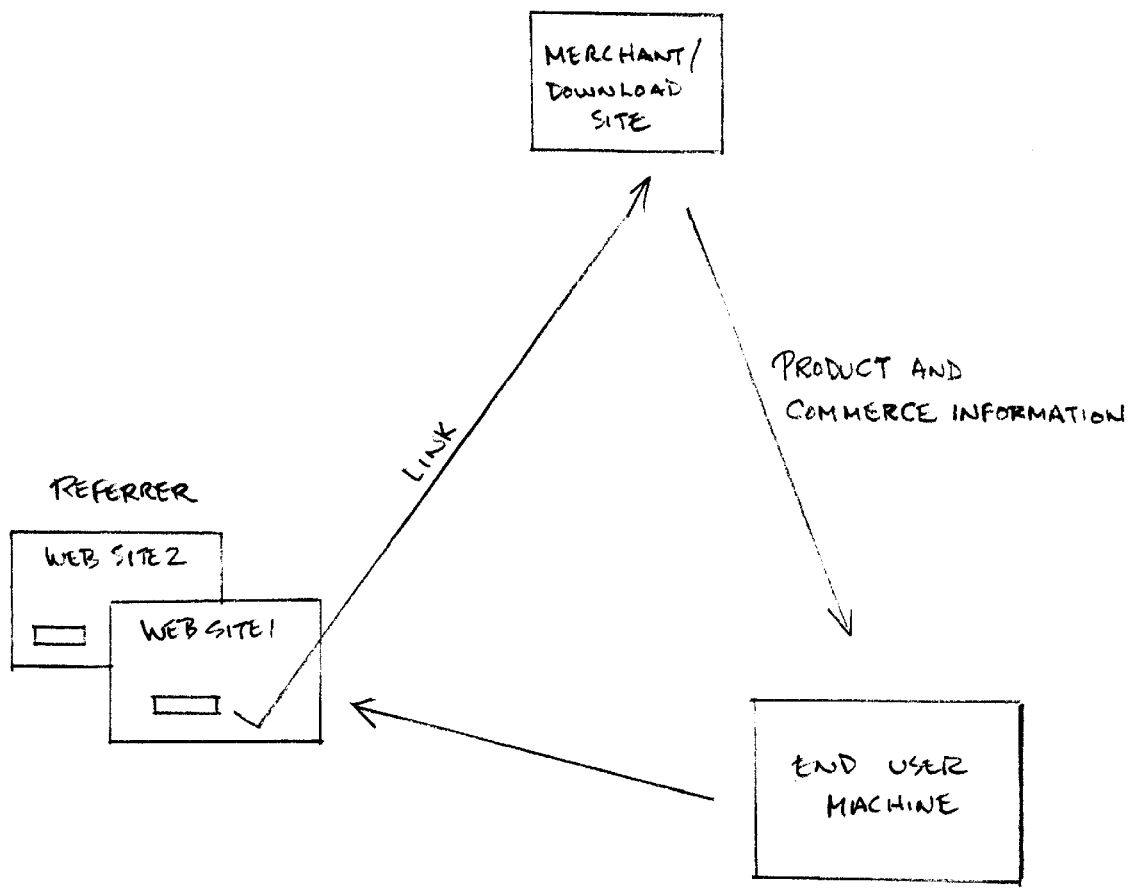
FIG. 2 is a functional block diagram representing a download transaction.

Referring now to FIG. 2, in one embodiment of the invention, product files, for one software product or thousands of software products, are stored at a merchant/download site. An end user may download a software product by visiting the merchant site directly. To increase market presence, however, links to the merchant site are provided at other (possibly very numerous) sites. Such links cause download of the software program from the merchant site to the end user. When the link is followed, the source of the link (i.e., the identity of the referrer) is communicated to the merchant site. In the download process, identification information is added to the product file, to include referrer information and, optionally, variable information about the location of a purchase Web site, purchase mechanism, etc. (The latter information, however, may already be included in the download and may not need to be added.)

Figure 3:
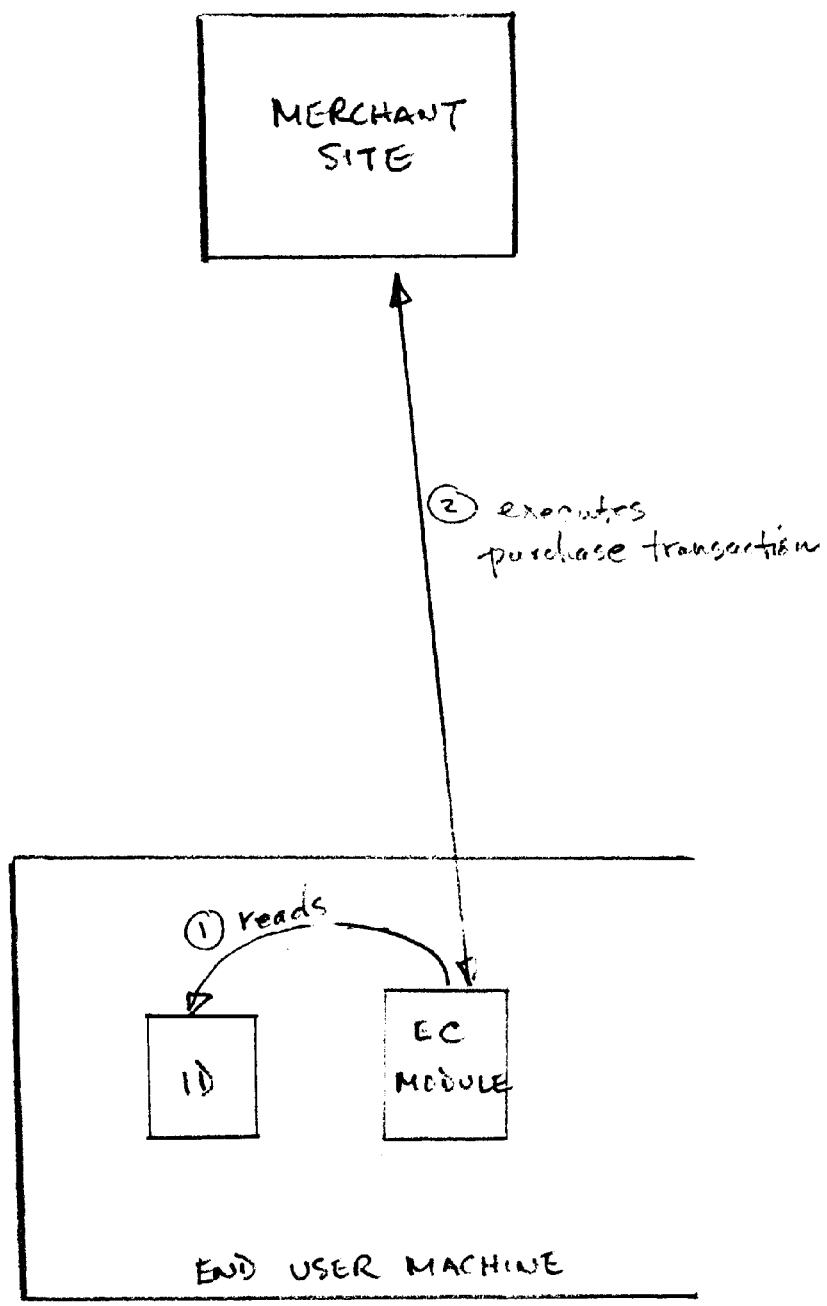
FIG. 3 is a functional block diagram representing a purchase transaction.

Referring to FIG. 3, at the time of purchase, an electronic commerce (EC) module initiates a purchase transaction with the merchant server. The location of the payment processor, the transaction process, the "merchant or record" for credit-card clearing, etc., may have been part of an EC-prepared product, or may have been added dynamically as a result of the referral. During the course of the purchase transaction, the identifying information is sent to the payment processor. The identifying information may be used in any desired manner by the transaction processing system. For example, the identifying information may affect only referral accounting, may affect only the present purchase transaction, or may affect both. Typically, the identifying information will be used to give credit to the appropriate referrer and may also be used to retrieve offer information that governs the price of the purchase transaction.

Figure 4:
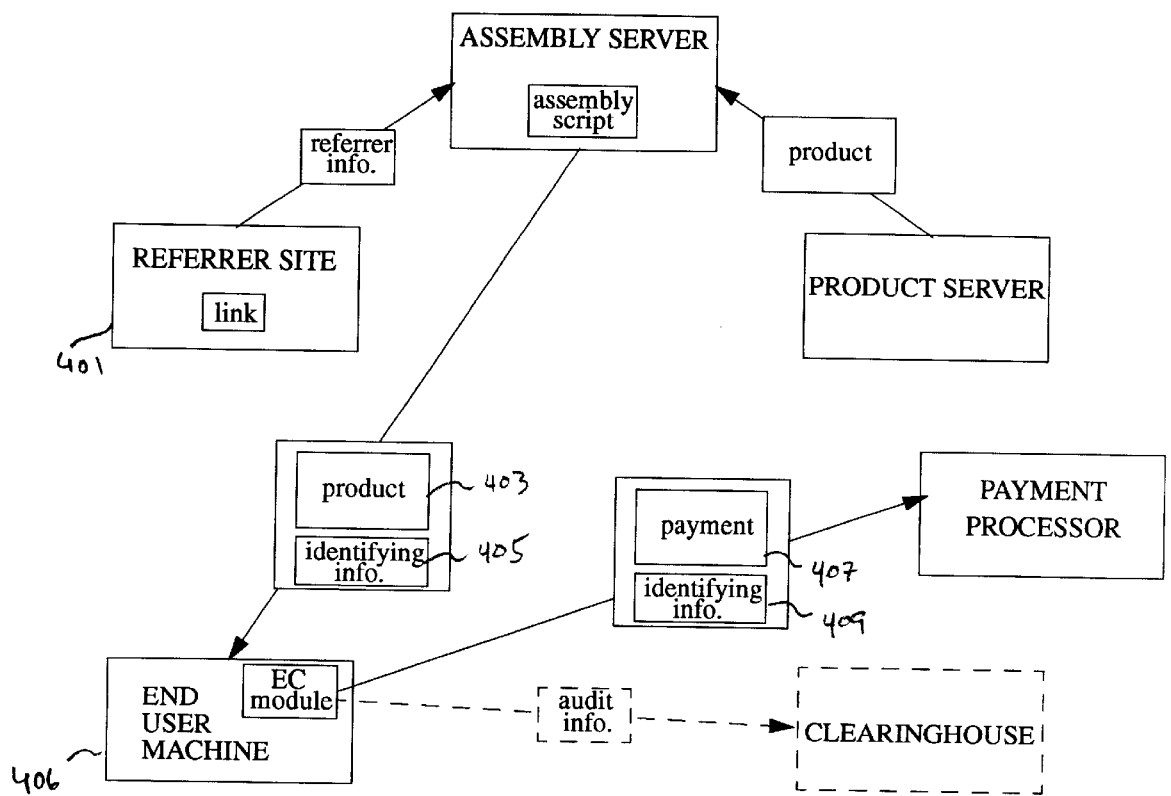
FIG. 4 is a functional block diagram representing a download transaction in accordance with another embodiment of the invention.

Referring to FIG. 4, in a more general embodiment of the invention, as many as six or more server—or as few as a single server—may be involved in a transaction. In FIG. 4, each separate function has been illustrated as being performed by a separate server. However, the functions may be combined in various ways. In comparison with FIG. 2, which shows the end user machine, a referring site and a merchant site, FIG. 4 shows in addition a product server, an assembly server, a payment processor and, optionally, a clearinghouse.

The transaction begins with the occurrence of a referral from a Web site 401. The referral causes deliver of content (403) and deliver of identifying information (405) to an end user machine 406. At a later time, electronic payment is received (507) from the end user machine, and identifying information is received (409) from the end user machine. The identifying information is used to credit the referrer.

In general, a transaction may be divided into three phases, an assembly phase, an installation phase, and a purchase phase. A transaction begins with a link within a Web page of a referring site being clicked on. As a result, referrer information is sent to the assembly server, causing an assembly script to be run. During the assembly phase, the assembly script retrieves a corresponding product from the product server and combines with the product referral information and possibly other information. The result may be an executable program or may be a BOB ("Bag of Bits") that may later be transformed into an executable program or may remain as non-executable content.

At some point after the product has been downloaded to the end user machine, the user initiates installation of the product. Installation may be performed by an installer as previously described, in which case installation is typically initiated by clicking on the download. Alternatively, the user may run a local program that is registered with run-time software—e.g., the operating system or browser—to install a BOB. Either during download or during installation, the referral information is read and stored in a suitable place on the end user machine. Also, an EC client may be installed on the end user machine to allow the software to be purchased, or such a client may already exist, for example as part of the aforementioned local registered program. The EC client may insist on immediate payment or it may periodically inform the end user of the time remaining during which the product may be used without purchase and give the user an opportunity to purchase the product, e.g., by clicking on a Buy button, or it may make the product available for rental.

During payment, the EC client sends the referral information previously stored on the end user machine to the payment processor. When the payment processor receives the referral information, it automatically credits an account of the referrer. Optionally, the referral information may also be sent to a clearinghouse for auditing purposes. Alternatively, so as not to burden the payment processor with the possibly unfamiliar task or referral tracking, the EC client may send the referrer information to a clearinghouse upon payment It will be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

What is claimed is:

1. A method of rewarding a referrer in a Web-based download-then-pay electronic content distribution system, comprising the steps of:

an end user, using an end user machine, viewing a referrer Web site and activating a link associated with a message recommending specified electronic content;

a Web server delivering a copy of the specified electronic content to the end user machine in response to activation of the link;

a Web server delivering identifying information to the end user machine in response to activation of the link;

storing the identifying information on the end user machine for a period of time;

the end user effecting payment for the specified electronic content using a web browser, wherein payment is received by a Web server, payment resulting in delivering the identifying information to a Web server: and the latter Web server receiving the identifying information and, using the identifying information, taking action benefitting the referrer.

2. The method of claim 1, wherein the foregoing Web server functions are performed by a single Web server.

3. The method of claim 1, wherein the foregoing Web server functions are apportioned among multiple Web servers.

4. A method of giving referral credit for a download-then-pay digital content transaction, comprising the steps of:
  including as part of a Web site a link to a product assembly site from which the digital content can be downloaded;
  a user clicking on the link;
  communicating identifying information to the product assembly site;
  at the product assembly site, creating a modified download including identifying information; and
  downloading the modified download to the user.

5. The method of claim 4, comprising the further step of, during a subsequent purchase transaction, communicating the identifying information from a user machine to a Web site.

6. The method of claim 5, wherein said Web site is a merchant Web site.

7. The method of claim 5, wherein said Web site is a payment processor Web site.

8. The method of claim 5, wherein said Web site is a clearinghouse Web site.

9. The method of claim 5, comprising the further step of using the identifying information to credit a referrer's account.

10. A computer readable medium including program instructions for dynamically branding electronically distributed electronic content at the time of download, said program instructions including instructions for adding referrer information to said digital electronic content at the time of download.

11. The method of claim 10, wherein said program instructions further include instructions for providing as part of said product an executable setup file.

12. The method of claim 10 wherein said program instructions further include instructions for adding as part of said product an Electronic Commerce module.

13. The method of claim 1, wherein the identifying information identifies the referrer.

14. The method of claim 4, wherein the identifying information identifies the referrer.

* * * * *